US012359609B1

(12) United States Patent
Cress et al.

(10) Patent No.: US 12,359,609 B1
(45) Date of Patent: Jul. 15, 2025

(54) EXTENDED-LIFE PRECHAMBER SPARKPLUG FOR ENGINE SYSTEM AND ENGINE SYSTEM OPERATING METHOD

(71) Applicant: Caterpillar Inc., Peoria, IL (US)

(72) Inventors: James Jay Cress, West Lafayette, IN (US); Andrew G. Hockett, Austin, TX (US); Sean J. Moser, Bellingham, WA (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/679,767

(22) Filed: May 31, 2024

(51) Int. Cl.
*F02B 19/02* (2006.01)
*F02B 19/12* (2006.01)
*F02B 19/18* (2006.01)
*F02M 21/02* (2006.01)

(52) U.S. Cl.
CPC .............. *F02B 19/02* (2013.01); *F02B 19/12* (2013.01); *F02B 19/18* (2013.01); *F02M 21/023* (2013.01)

(58) Field of Classification Search
CPC .. F02B 1/04; F02B 19/02; F02B 19/12; F02B 19/18; F02M 21/023
See application file for complete search history.

(56) References Cited

U.S. PATENT DOCUMENTS 3,710,764 A * 1/1973 Jozlin .................... F02F 1/242 123/DIG. 9
4,892,070 A * 1/1990 Kuhnert .................. F02F 1/242 123/274
5,081,969 A * 1/1992 Long, III ............ F02B 19/1057 123/274
6,575,192 B1 6/2003 Shaffer
7,950,364 B2 5/2011 Nerheim
8,826,883 B2 9/2014 Ishida et al.
8,910,612 B2 12/2014 Woo et al.
10,519,848 B2 12/2019 Koshiba et al.
(Continued)

FOREIGN PATENT DOCUMENTS

DE 102018210808 A1 * 1/2020
DE 102022125505 A1 * 4/2024 .............. F02B 19/02
(Continued)

OTHER PUBLICATIONS

Borror, Bruce M., "Replacement Sheet" for Drawings of "Pre-Chamber Type Spark Plug Including Releasable End Cap Mechanism," Dec. 21, 2007, U.S. Appl. No. 11/400,867, filed Apr. 10, 2006, published on Oct. 11, 2007, abandoned on Jul. 13, 2009, pp. 1-7 (Year: 2007).*

*Primary Examiner* — John M Zaleskas
(74) *Attorney, Agent, or Firm* — Brannon Sowers & Cracraft PC

(57) ABSTRACT

A prechamber sparkplug includes a sparkplug housing forming a prechamber, and an electrode within the prechamber and defining a spark gap with the sparkplug housing. The prechamber sparkplug further includes a valvular element such as a check, a valve, or a tesla valve, structured to preferentially permit ejection of fluids from the prechamber over admission of fluids to the prechamber. Varying relative restriction of fluids into versus out of the prechamber can limit a charge density within the prechamber extending sparkplug service life, particularly in high power density engine applications. Related apparatus and methodology is also disclosed.

12 Claims, 3 Drawing Sheets

(56) References Cited

U.S. PATENT DOCUMENTS

| | | | | |
|---|---|---|---|---|
| 11,035,334 | B1 | 6/2021 | Cress et al. | |
| 11,143,091 | B2 | 10/2021 | Wei et al. | |
| 11,293,337 | B1 * | 4/2022 | Czekala | F02B 19/18 |
| 11,378,002 | B1 * | 7/2022 | Leone | F02B 19/1047 |
| 2007/0236122 | A1 * | 10/2007 | Borror | H01T 13/54 313/118 |
| 2009/0309475 | A1 * | 12/2009 | Tozzi | H01T 13/54 313/143 |
| 2011/0215703 | A1 * | 9/2011 | Maul | H01T 13/54 445/7 |
| 2016/0254650 | A1 * | 9/2016 | Maul | H01T 13/54 123/169 EL |
| 2017/0145898 | A1 * | 5/2017 | Schäfer | F02P 13/00 |
| 2019/0072025 | A1 * | 3/2019 | Rabhi | F02B 19/18 |
| 2019/0376441 | A1 * | 12/2019 | Brubaker | F02P 13/00 |
| 2020/0080508 | A1 * | 3/2020 | Rabhi | F02B 19/1071 |
| 2020/0362750 | A1 * | 11/2020 | Rabhi | F02B 19/18 |
| 2021/0254543 | A1 * | 8/2021 | Rabhi | F02B 19/02 |
| 2022/0120208 | A1 * | 4/2022 | Rabhi | F02B 19/165 |
| 2024/0240584 | A1 * | 7/2024 | Rabhi | F02P 15/006 |

FOREIGN PATENT DOCUMENTS

| | | | | | |
|---|---|---|---|---|---|
| DE | 102022125515 | A1 | * | 4/2024 | |
| GB | 2554719 | A | * | 4/2018 | F02B 19/00 |
| JP | 2006322367 | A | * | 11/2006 | F02P 13/00 |
| WO | WO-2021160944 | A1 | * | 8/2021 | F02B 19/02 |

* cited by examiner

EXTENDED-LIFE PRECHAMBER SPARKPLUG FOR ENGINE SYSTEM AND ENGINE SYSTEM OPERATING METHOD

TECHNICAL FIELD

The present disclosure relates generally to a prechamber sparkplug, and more particularly to a prechamber sparkplug structured to preferentially permit ejection of fluids over admission of fluids to limit a charge density in the prechamber thereby extending sparkplug service life.

BACKGROUND

Sparkplugs have been used in internal combustion engines for over a century. In a well-known fashion, a sparkplug generates an electrical spark that ignites a mixture of fuel and air to cause a controlled combustion reaction in a cylinder, driving a piston to rotate a crankshaft. Open sparkplugs, such as those conventionally used in automotive engines, position the spark gap directly in the main combustion chamber. Prechamber sparkplugs, often used in more heavy-duty engine applications, enclose the spark gap in a so-called prechamber fluidly connected to the main combustion chamber that enables ignition of a relatively small ignition charge of a fuel and air, producing jets of hot fluids that are ejected into the main combustion chamber to ignite a larger, main charge. Prechamber sparkplugs are often used in stoichiometrically lean applications where ignition of a fuel and air mixture can often be challenging, but more readily achievable in the relatively small and confined volume of the prechamber.

In many instances, sparkplugs are consumable parts having a limited service life that can be considerably less than a service life of the overall engine platform. Many sparkplugs utilize exotic and/or expensive precious metals, thus optimizing sparkplug service life can reduce overall ownership costs.

In recent years, many engines have been proposed that employ a relatively high charge density in an effort to optimize the overall power density of the engine platform. It has been observed that an increased charge density can be associated with reduced sparkplug service life, however. The physics of spark generation tend to result in ejection of ions of spark electrode materials when a spark is produced, causing erosion of the electrodes over time, processes that can be somewhat accelerated in high power density engines. A breakdown voltage necessary to generate a spark tends to eventually become so high that continued operation of a sparkplug becomes impractical. One known strategy for extending service life of a sparkplug is set forth in U.S. Pat. No. 11,035,334 B1 to Cress. While Cress undoubtedly has applications, there is always room for improvement and development of alternative strategies.

SUMMARY

In one aspect, a prechamber sparkplug includes a sparkplug housing having an outer housing surface, and an inner housing surface forming a prechamber. The prechamber sparkplug further includes an electrode within the prechamber and defining a spark gap with the sparkplug housing. The sparkplug housing further forms at least one fluid conduit extending between the inner housing surface and the outer housing surface, and the prechamber sparkplug further includes a valvular element at least partially within the at least one fluid conduit and structured to preferentially permit ejection of fluids from the prechamber over admission of fluids to the prechamber via the at least one fluid conduit.

In another aspect, an engine system includes an engine housing, and a prechamber sparkplug supported in the engine housing, and having a spark electrode within a prechamber. The prechamber sparkplug further includes at least one fluid conduit fluidly connected to the prechamber and opening in an outer surface of the prechamber sparkplug, and a valvular element at least partially within the at least one fluid conduit.

In still another aspect, a method of operating an engine system includes admitting fuel and air from a cylinder in an engine into a prechamber fluidly connected to the cylinder so as to form an ignition charge in the prechamber. The method further includes spark-igniting the ignition charge in the prechamber, and ejecting fluids produced via the spark-ignition of the ignition charge from the prechamber into the cylinder so as to ignite a main charge of fuel and air in the cylinder. The method still further includes restricting the admission of fuel and air from the cylinder into the prechamber to a first extent, and restricting the ejection of the fluids of the prechamber into the cylinder to a second extent less than the first extent.

DETAILED DESCRIPTION

Figure 1:
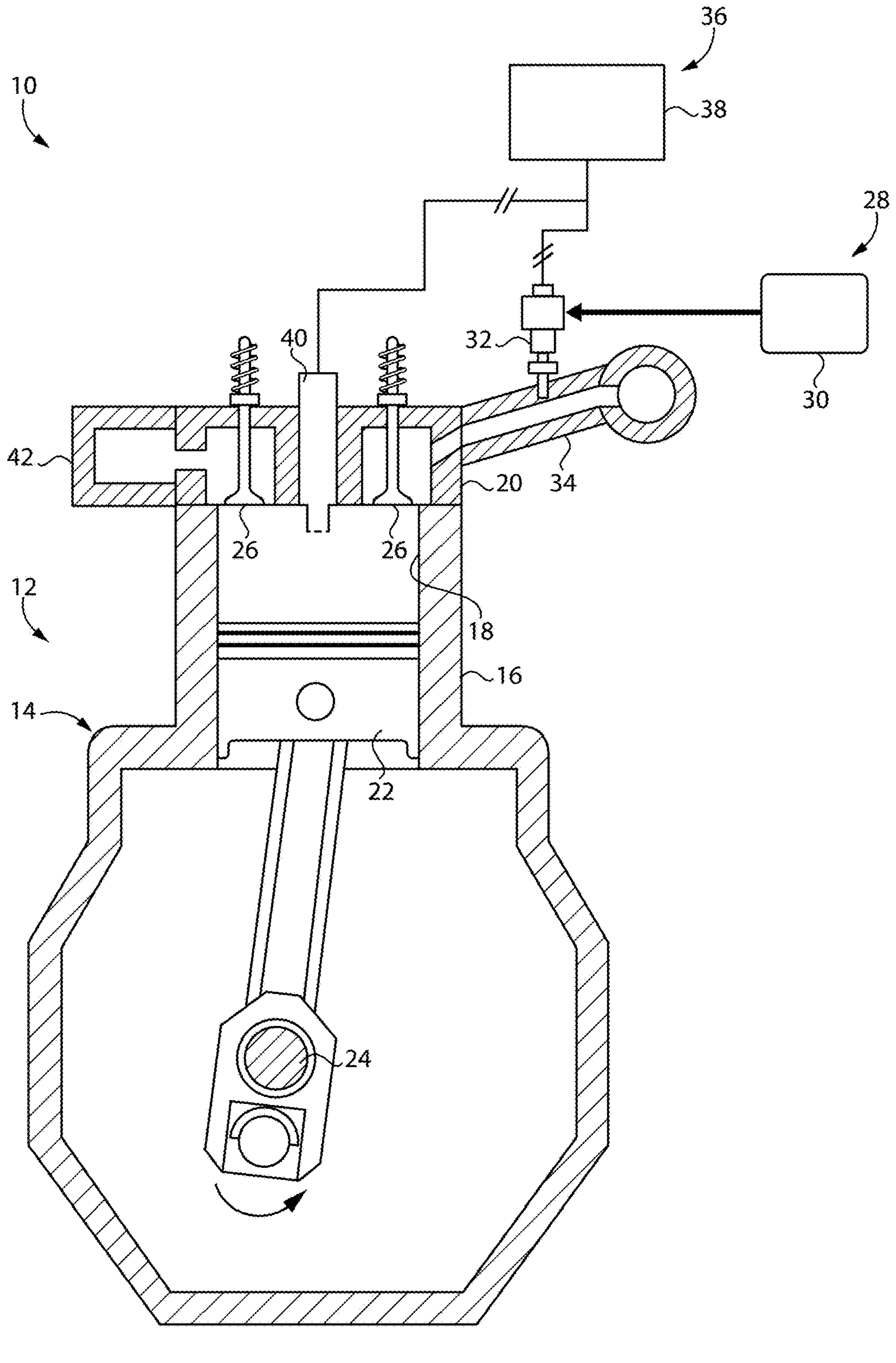
FIG. 1 is a sectioned diagrammatic view of an internal combustion engine system, according to one embodiment.

Referring to FIG. 1, there is shown an internal combustion engine system 10, according to one embodiment. Engine system 10 includes an internal combustion engine 12 having an engine housing 14. Engine housing 14 includes a cylinder block 16 having a combustion cylinder 18 formed therein. A cylinder head 20 is attached to cylinder block 16. A piston 22 is positioned in cylinder 18 and movable in a generally conventional manner between a top-dead-center position and a bottom-dead-center position to rotate a crankshaft 24. Cylinder 18 may be one of any number of cylinders in engine 12 in any suitable arrangement such as an inline patten, a V-pattern, or still another. A plurality of engine valves 26 are shown supported in cylinder head 20 and movable to open and close fluid communication between an intake conduit 34 and cylinder 18, and between an exhaust manifold 42 and cylinder 18. A total of two intake valves and a total of two exhaust valves may be used in some embodiments in a generally conventional manner. Engine system 10 can be applied for any known purpose including to operate an electrical generator, a pump, a compressor, or a driveline in a land vehicle or a marine vessel to name a few examples.

Engine system 10 further includes a fuel system 28. Fuel system 28 includes a fuel supply 30 containing, for example, a gaseous fuel such as natural gas, hydrogen, various blends of hydrocarbon fuels and hydrogen, or still others. Fuel system 28 also includes a gaseous fuel admission valve 32 coupled to intake conduit 34 and structured to admit a gaseous fuel to intake conduit 34 for combustion in cylinder 18. In other embodiments, engine system 10 could be direct-injected, fueled by fumigation admission of a gaseous fuel, or by way of combinations of these or various other known strategies. Certain dual liquid and gaseous fuel engines may fall within the scope of the present disclosure.

Engine system 10 further includes an ignition system 36. Ignition system 36 includes an electronic control unit or ECU 38 or other electrical apparatus such as an ignition coil structured to energize a spark electrode in a sparkplug 40. Sparkplug 40 includes a prechamber sparkplug supported in cylinder head 20. As will be apparent to those skilled in the art sparkplug 40 can be energized to produce an electrical spark within a prechamber to be described that ignites an ignition charge of a fuel and air. Ignition of the fuel and air of the ignition charge produces hot jets of fluids including combustion products that are conveyed into cylinder 18 to ignite a main charge of a fuel and air according to generally known principles. The ignition charge can be formed based upon fuel and air urged into sparkplug 40 during a compression stroke of piston 22. As suggested above, certain engine designs have sought to optimize power density. As will be further apparent from the following description sparkplug 40 is configured for extended service life compared to certain known strategies. In at least some instances, sparkplug 40 may last a full-service life of engine system 10 until a timing of a top end overhaul.

Figure 2:
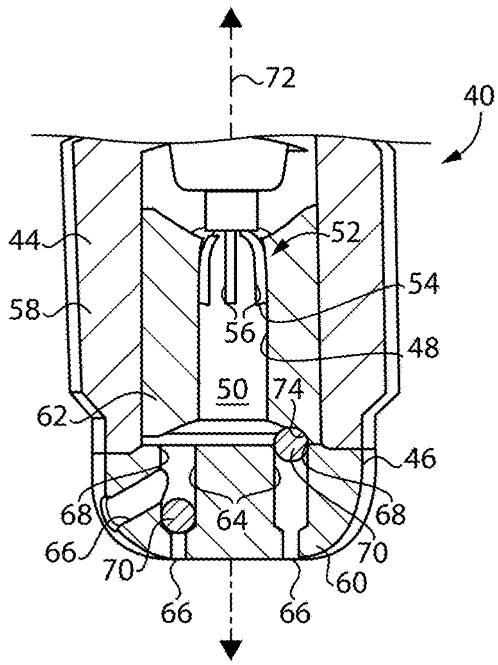
FIG. 2 is a sectioned side diagrammatic view of a portion of a prechamber sparkplug, according to one embodiment.

Referring also now to FIG. 2, there are shown features of prechamber sparkplug 40 in further detail. Sparkplug 40 includes a sparkplug housing 44 defining a longitudinal axis 72, and including an outer housing surface 46, and an inner housing surface 48 forming a prechamber 50. Sparkplug 40 also includes an electrode 52 within prechamber 50 and defining a spark gap 54 with sparkplug housing 44. In a practical implementation, electrode 52 includes a plurality of electrode prongs 56 defining a plurality of spark gaps with sparkplug housing 44. Electrode 52 may include a center electrode configured as a cathode, although the present disclosure is not strictly limited as such. Electrode 52 may include or be formed of any suitable electrode materials including but not limited to iridium, platinum, rhodium, iron, various combinations and alloys of these and/or any other suitable known spark electrode materials.

In the illustrated embodiment, sparkplug housing 44 includes a first housing piece 58, a tip piece 60, and an insert piece 62. Other housing arrangements and configurations are within the scope of the present disclosure. Sparkplug housing 44 further forms at least one fluid conduit 66 extending between inner housing surface 48 and outer housing surface 46. In the illustrated embodiment the at least one fluid conduit 64, referred to hereinafter, at times, in the singular, extends from one or more outer ports 66 to a singular inner port 68. In the section plane of FIG. 2, the leftmost one of fluid conduits 64 can be seen to extend from two outer ports 66 to a singular inner port 66. Fluid conduits 64 are formed in tip piece 60, although the present disclosure is not strictly limited as such. Sparkplug 44 further includes a valvular element 70 positioned at least partially within fluid conduit 64 and structured to preferentially permit ejection of fluids from prechamber 50 via fluid conduit 64 over admission of fluids to prechamber 50 via fluid conduit 64. Sparkplug 40 may include a plurality of valvular elements 70 each positioned at least partially within a respective one of a plurality of fluid conduits 64 and structured to operate in the manner described.

In the embodiment of FIG. 2, valvular elements 70 are movable to vary a flow area through the respective fluid conduits 64, providing a relatively reduced, smaller, or zero flow area during admission of fluids to prechamber 50, and a relatively increased or larger flow area during ejection of fluids from prechamber 50. The leftmost one of valvular elements 70 shown in FIG. 2 can be understood to be in an open position, as it might occupy just prior to being impinged upon by a flow of incoming fuel and air to be admitted during a compression stroke of a piston within the respective cylinder. In the open position a larger flow area through fluid conduit 64 is provided. The rightmost valvular element 70 is shown as it might appear in a second position, potentially but not necessarily a fully closed position, in contact with a seat or stop 74 formed by insert piece 62, and having been moved in response to impingement by a flow of incoming fuel and air during a piston compression stroke. In the second position a smaller flow area through fluid conduit 64 is provided. The two valvular elements 70 pictured in FIG. 2 are shown in different positions for illustrative purposes, however, it will be appreciated valvular elements 70 will typically move substantially simultaneously between a first position and a second position. Valvular elements 70 have the form of ball checks in the embodiment of FIG. 2. Other embodiments discussed herein propose ball checks, check plates, flaps, or still other structures for preferentially permitting ejection of fluids from a prechamber over admission of fluids to a prechamber.

Figure 3:
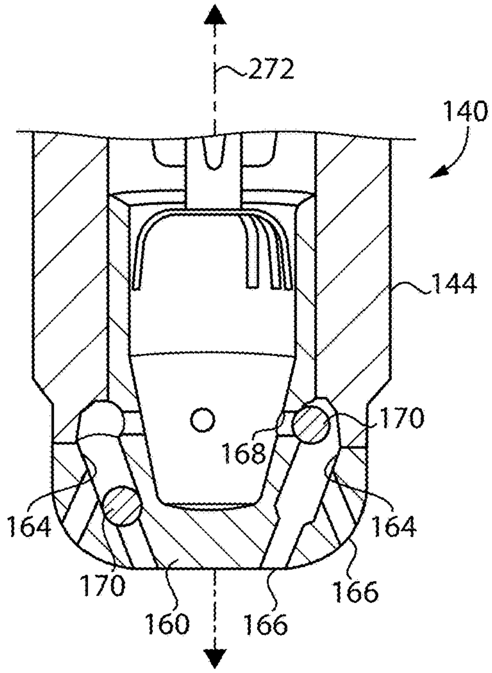
FIG. 3 is a sectioned side diagrammatic view of a portion of a prechamber sparkplug, according to another embodiment.

Referring now to FIG. 3, there is shown a sparkplug 140 according to another embodiment and including a sparkplug housing 144 having a tip piece 160 with a plurality of fluid conduits 164 formed therein and each extending between a plurality of outer ports 166 and a singular inner port 168. Sparkplug housing 144 defines a longitudinal axis 172, and inner ports 168 are oriented to permit flow into and out of sparkplug 140 along generally radial directions relative to an axis 272.

Figure 4:
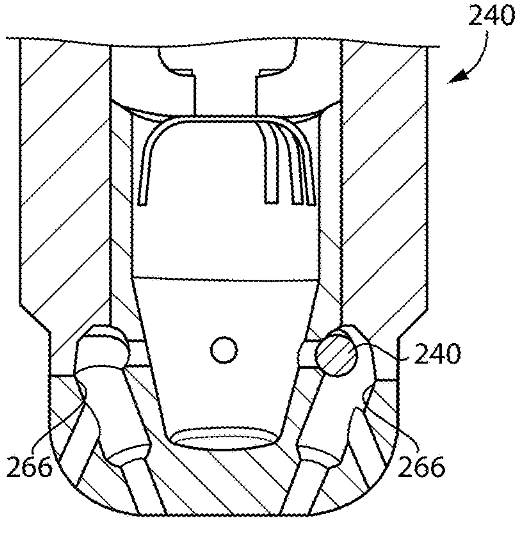
FIG. 4 is a sectioned side diagrammatic view of a portion of a prechamber sparkplug, according to yet another embodiment.

Referring to FIG. 4, there is shown a sparkplug 240 according to yet another embodiment and including a plurality of fluid conduits generally analogous to those pictured in the embodiment of FIG. 3. In the FIG. 4 embodiment, however, only a singular valvular element 270 is provided, thus one of fluid conduits 266 is equipped with a valvular element 270 and one is not.

A number of fluid conduits in any of the embodiments contemplated herein can include one fluid conduit, two fluid conduits, or a greater number such as 3, 4, 5, or 6. One or more of the fluid conduits may be equipped with a valvular element operable to function according to the principles discussed herein.

Figure 5:
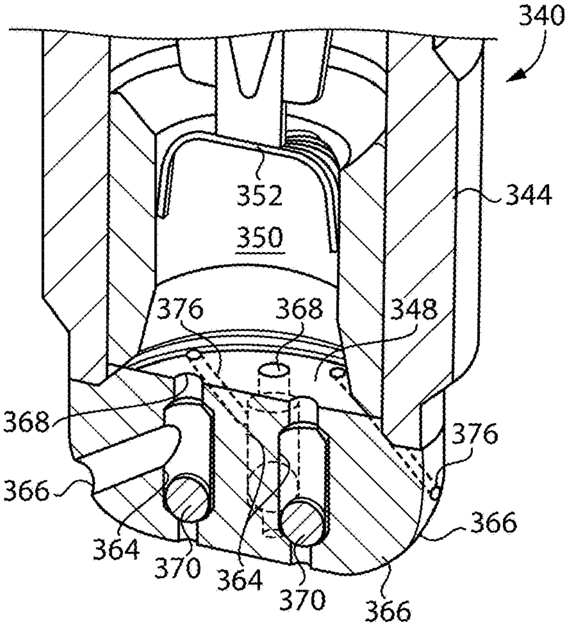
FIG. 5 is an isometric view of a portion of a prechamber sparkplug, according to yet another embodiment.

Turning now to FIG. 5, there is shown another sparkplug 340 including a sparkplug housing 344 having an inner surface 348 and forming a prechamber 350. Inner surface 348 is formed on a tip piece 360. An electrode 352 generally analogous to those described in connection with other embodiments herein extends into prechamber 350. A plurality of fluid conduits 364 are formed in tip piece 360 and each extend between one or more outer ports 366 and a singular inner port 368 opening in inner surface 348. Sparkplug 340 also includes a plurality of always-open conduits 376 formed in tip piece 360. In this embodiment, a plurality of valvular elements 370 may move to fully closed positions blocking admission of fluids into prechamber 350 while always-open fluid conduits 376 maintain continuous fluid communication between a respective cylinder and prechamber 350.

Figure 6:
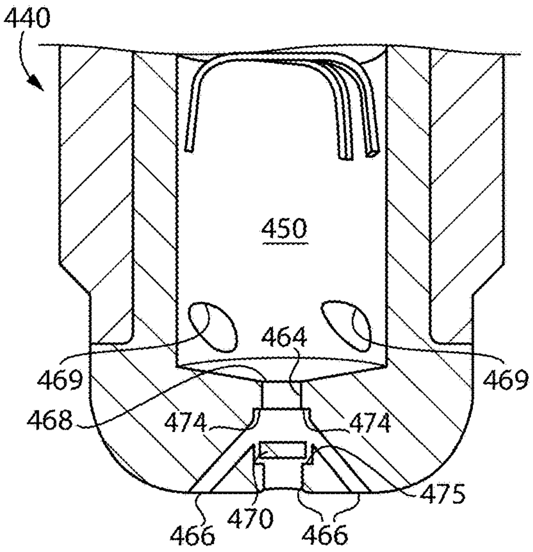
FIG. 6 is a sectioned side diagrammatic view of a portion of a prechamber sparkplug, according to yet another embodiment.

Turning now to FIG. 6, there is shown a sparkplug 440 according to yet another embodiment and forming a prechamber 450. In the embodiment of FIG. 6, a generally centrally located fluid conduit 464 extends between a plurality, for example two, of outer ports 466 and a singular inner port 468. A plurality of fluid conduits 369 may also be provided as shown, extending angularly through sparkplug 440 and opening to prechamber 450. Sparkplug 440 also includes a valvular element 470 having the general form of a check plate or disc and movable between a first position, approximately as depicted, contacting a lower seat or stop 475, and a second position contacting an upper seat or stop 474. Fluid conduits 469 may include always-open fluid conduits. In this way, moving of valvular element 470 to contact seat or stop 474 limits a flow area through fluid conduit 468 while flow area through fluid conduits 469 remains open.

Figure 7:
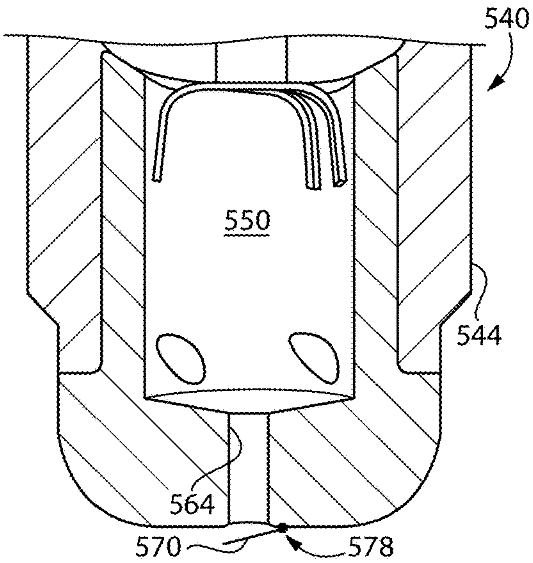
FIG. 7 is a side diagrammatic view of a portion of a prechamber sparkplug, according to yet another embodiment.

Turning now to FIG. 7, there is shown yet another sparkplug 540 forming a prechamber 550. Sparkplug 540 includes a valvular element 570 pivotable relative to a sparkplug housing 544 to vary a flow area through a fluid conduit 564 to prechamber 550. In the illustrated embodiment, valvular element 570 is pivotable relative to sparkplug housing 544, for example, pivoting about a pivot axis 578 in a pivoting range that extends outside of sparkplug housing 544. In this embodiment, increased pressure in a corresponding cylinder and flow into prechamber 550 can cause valvular element or flap 570 to move toward a closed position and restrict a flow area into prechamber 550. Ejection of fluids can cause valvular element 570 to move toward a more open position less restrictive of flow through fluid conduit 564.

Figure 8:
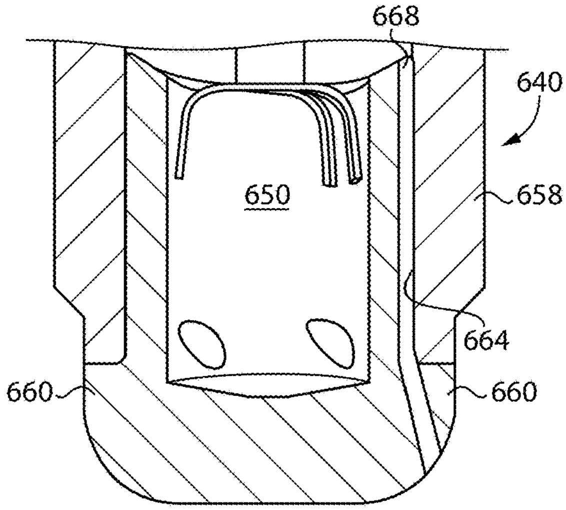
FIG. 8 is a sectioned side diagrammatic view of a portion of a prechamber sparkplug, according to yet another embodiment.
Figure 9:
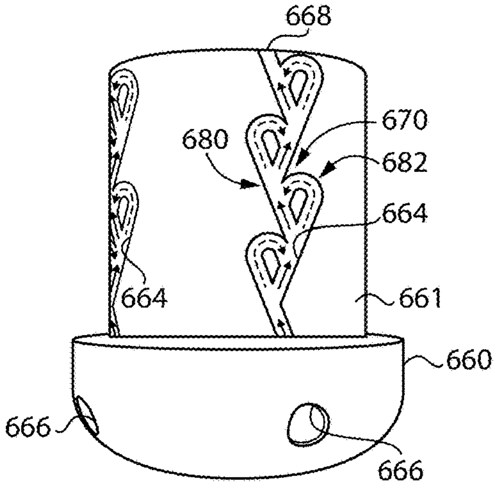
FIG. 9 is a diagrammatic view of a portion of the prechamber sparkplug as in FIG. 8.

Turning now to FIG. 8, there is shown yet another embodiment of a sparkplug 640 according to the present disclosure. Sparkplug 640 includes one or more fluid conduits 664 extending through a tip piece 660 to an inner port 668 fluidly connected to a prechamber 650. Referring also to FIG. 9, there it can be seen that fluid conduits 664 may be formed in an outer surface 661 of tip piece 660. A valvular element 670 at least partially within fluid conduit 664 includes a tesla valve having a plurality of linear sections 680 and a plurality of recurving sections 682 connecting between linear sections 680. Configured as a tesla valve, valvular element 670 preferentially permits ejection of fluids from prechamber 650 over admission of fluids to prechamber 650. It can also be appreciated that when tip piece 660 is installed in housing piece 658 fluid conduits 664 are defined between tip piece 660 and housing piece 658. In the illustrated embodiment fluid conduit 664 extends between an outer port 666, and an inner port 668 opening approximately at an end of tip piece 660. In other embodiments, fluid conduits 664 could have an angular orientation through sparkplug 640 so as to open in sidewalls of prechamber 650. Sparkplug 640 might include one or more, and potentially all, of a plurality of fluid conduits equipped with a valvular element configured as a tesla valve.

Figure 10:
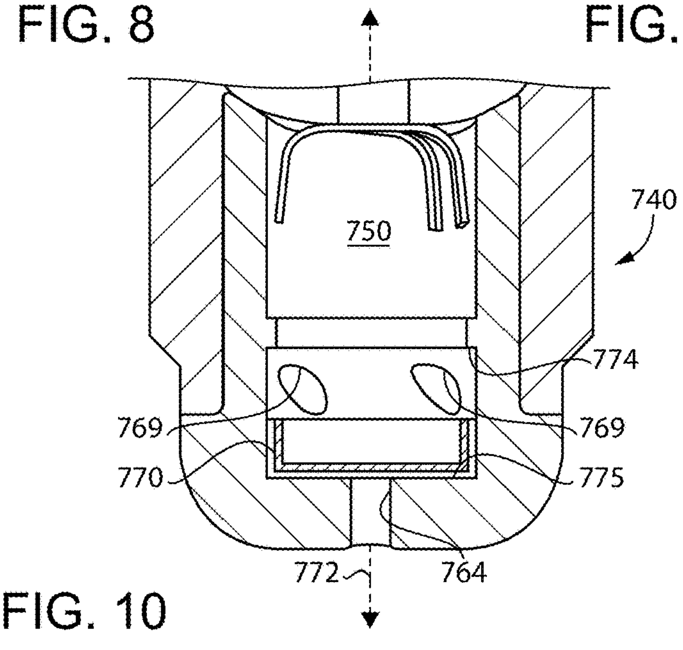
FIG. 10 is a sectioned side diagrammatic view of a portion of a prechamber sparkplug, according to yet another embodiment.

Turning now to FIG. 10, there is shown yet another embodiment of a sparkplug 740 according to the present disclosure and including a plurality of fluid conduits 769 opening to a prechamber 750. Sparkplug 740 defines a longitudinal axis 772. Sparkplug 740 also includes a valvular element 770 that is movable between a first position in contact with a first stop or seat 775, and a second position in contact with a second stop or seat 774. Valvular element 770 can be generally disc shaped having a C-shaped cross-sectional profile as shown and movable generally in a direction along a longitudinal axis 772 to simultaneously block some or all of fluid conduits 769.

INDUSTRIAL APPLICABILITY

Referring to the drawings generally, but returning focus to the embodiment of FIG. 2, operating engine system 10 can include admitting fuel and air from cylinder 18 in engine 12 into prechamber 50, prechamber 50 being fluidly connected to cylinder 18. The admission of fuel and air can occur during a compression stroke of piston 22 as discussed herein, and forms an ignition charge in prechamber 50. At an appropriate timing, control unit 38 can be operated to energize spark electrode 52 to form an electrical spark at spark gap 54 and spark-ignite the ignition charge in prechamber 50. The ignited charge forms hot gases including combustion products, ejected as fluids produced via the spark-ignition of the ignition charge from prechamber 50 into cylinder 18 so as to ignite a main charge of fuel and air in cylinder 18. This general process can be repeated for each engine cycle. In a practical implementation, engine 12 can be operated in a four-stroke engine cycle.

As will be apparent from the foregoing description, all embodiments of the present disclosure can be understood to restrict admission of fuel and air from the corresponding cylinder into a prechamber in a prechamber sparkplug to a first extent and restrict the ejection of fluids from the prechamber to a second extent less that the first extent. For instance, in the embodiment of FIG. 2, the increased pressure and flow during a piston compression stroke can cause valvular elements 70 to move from down positions to upward positions reducing a flow area available for fluids from cylinder 18 to enter prechamber 50. With flow thusly reduced, a charge density of the admission charge in prechamber 50 may be less than a charge density in cylinder 18 at least at such time as piston 22 reaches or approaches a top-dead-center position. When the ignition charge ignites the rapid pressure and temperature rise in prechamber 50 can rapidly cause valvular elements 70 to move back towards more open positions, less restricting of flow out of prechamber 50.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase “based on” is intended to mean “based, at least in part, on” unless explicitly stated otherwise.

What is claimed is:

1. A prechamber spark plug comprising:

a spark plug housing including an outer housing surface, and an inner housing surface forming a prechamber;

an electrode within the prechamber, and defining a spark gap with the spark plug housing;

the spark plug housing further forming at least one fluid conduit extending between the inner housing surface and the outer housing surface;

a valvular element at least partially within the at least one fluid conduit and structured to preferentially permit ejection of fluids from the prechamber over admission of fluids to the prechamber via the at least one fluid conduit; and the spark plug housing forms a plurality of always-open fluid conduits extending between the inner housing surface and the outer housing surface and fluidly connected to the prechamber.

2. The prechamber spark plug of claim 1 wherein the valvular element is movable to vary a flow area through the at least one fluid conduit.

3. The prechamber spark plug of claim 2 wherein the valvular element is pivotable relative to the spark plug housing in a pivoting range.

4. The prechamber spark plug of claim 3 wherein the pivoting range extends outside of the spark plug housing.

5. The prechamber spark plug of claim 1 wherein the valvular element includes a check movable from an open position to a second position in response to an incoming flow of fluids through the at least one conduit.

6. The prechamber spark plug of claim 5 wherein the second position includes a closed position blocking admission of fluids to the prechamber.

7. The prechamber spark plug of claim 6 wherein the at least one fluid conduit includes a plurality of fluid conduits, and the check blocks the plurality of fluid conduits at the closed position.

8. The prechamber spark plug of claim 1 wherein the at least one fluid conduit fluidly connects a plurality of outer ports formed in the outer housing surface to a singular inner port formed in the inner housing surface.

9. The prechamber spark plug of claim 8 wherein the spark plug housing includes a tip piece, and the at least one fluid conduit is one of a plurality of fluid conduits formed in the tip piece, and the valvular element is one of a plurality of valvular elements each positioned at least partially within a respective one of the plurality of fluid conduits.

10. The prechamber spark plug of claim 1 wherein the valvular element includes a tesla valve.

11. A prechamber spark plug comprising:

a spark plug housing including an outer housing surface, and an inner housing surface forming a prechamber;

an electrode within the prechamber, and defining a spark gap with the spark plug housing;

the spark plug housing further forming at least one fluid conduit extending between the inner housing surface and the outer housing surface; and a valvular element at least partially within the at least one fluid conduit and structured to preferentially permit ejection of fluids from the prechamber over admission of fluids to the prechamber via the at least one fluid conduit;

wherein the valvular element includes a check movable from an open position to a second position in response to an incoming flow of fluids through the at least one conduit;

wherein the second position includes a closed position blocking admission of fluids to the prechamber;

wherein the at least one fluid conduit includes a plurality of fluid conduits, and the check blocks the plurality of fluid conduits at the closed position; and wherein the spark plug housing forms a plurality of always-open fluid conduits extending between the inner housing surface and the outer housing surface.

12. A prechamber spark plug comprising:

a spark plug housing including an outer housing surface, and an inner housing surface forming a prechamber;

an electrode within the prechamber, and defining a spark gap with the spark plug housing;

the spark plug housing further forming at least one fluid conduit extending between the inner housing surface and the outer housing surface; and a valvular element at least partially within the at least one fluid conduit and structured to preferentially permit ejection of fluids from the prechamber over admission of fluids to the prechamber via the at least one fluid conduit, wherein the at least one fluid conduit fluidly connects a plurality of outer ports formed in the outer housing surface to a singular inner port formed in the inner housing surface, wherein the spark plug housing includes a tip piece, and the at least one fluid conduit is one of a plurality of fluid conduits formed in the tip piece, and the valvular element is one of a plurality of valvular elements each positioned at least partially within a respective one of the plurality of fluid conduits.

* * * * *